United States Patent
Vermandel et al.

(10) Patent No.: US 9,493,657 B2
(45) Date of Patent: *Nov. 15, 2016

(54) AOX-FREE NAVY AND BLACK DISPERSE DYES

(71) Applicant: DyStar Colours Distribution GmbH, Raunheim (DE)

(72) Inventors: Fanny Vermandel, Singapore (SG); Adrian Murgatroyd, Frankfurt (DE); Clemens Grund, Hattersheim (DE); Manfred Hoppe, Kürten (DE); Ulrich Weingarten, Ludwigshafen (DE)

(73) Assignee: DyStar Colours Distribution GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/760,877

(22) PCT Filed: Jan. 6, 2014

(86) PCT No.: PCT/EP2014/050067
§ 371 (c)(1),
(2) Date: Jul. 14, 2015

(87) PCT Pub. No.: WO2014/108357
PCT Pub. Date: Jul. 17, 2014

(65) Prior Publication Data
US 2015/0353735 A1    Dec. 10, 2015

(30) Foreign Application Priority Data

Jan. 14, 2013 (EP) .................................. 13000169
Jan. 14, 2013 (EP) .................................. 13151174
Jan. 14, 2013 (EP) .................................. 13151183
Jan. 15, 2013 (EP) .................................. 13000205

(51) Int. Cl.
| | |
|---|---|
| C09B 62/00 | (2006.01) |
| C09B 67/22 | (2006.01) |
| D06P 3/54 | (2006.01) |
| C09B 29/36 | (2006.01) |
| C09B 23/00 | (2006.01) |
| D06P 3/60 | (2006.01) |
| D06P 1/18 | (2006.01) |
| D06P 3/04 | (2006.01) |

(52) U.S. Cl.
CPC ........... *C09B 67/0051* (2013.01); *C09B 23/00* (2013.01); *C09B 29/3691* (2013.01); *D06P 1/18* (2013.01); *D06P 3/043* (2013.01); *D06P 3/54* (2013.01); *D06P 3/6041* (2013.01)

(58) Field of Classification Search
CPC .......... C09B 67/0051; C09B 29/3691; C09B 23/00
USPC ........................................................... 8/543
See application file for complete search history.

(56) References Cited

U.S. PATENT DOCUMENTS

| | | | |
|---|---|---|---|
| 3,980,634 A | 9/1976 | Weaver | |
| 4,348,319 A | 9/1982 | Hamprecht | |
| 4,681,932 A * | 7/1987 | Kruckenberg | C09B 29/0081 534/565 |
| 4,734,490 A | 3/1988 | Schwander et al. | |
| 5,102,425 A | 4/1992 | Buhler et al. | |
| 5,688,288 A * | 11/1997 | Akatani | C09B 67/0051 8/638 |
| 5,910,624 A | 6/1999 | Wanken et al. | |
| 6,008,332 A | 12/1999 | Herzig et al. | |
| 6,555,664 B1 | 4/2003 | Lauk et al. | |

FOREIGN PATENT DOCUMENTS

| | | |
|---|---|---|
| CN | 101735663 A | 6/2010 |
| CN | 101760046 A | 6/2010 |
| CN | 101768375 A | 7/2010 |
| CN | 101955691 A | 1/2011 |
| CN | 101974255 A | 2/2011 |
| CN | 102153890 A | 8/2011 |
| CN | 102391680 A | 3/2012 |
| DE | 27 15 34 C | 3/1914 |
| DE | 26 23 251 A1 | 12/1976 |
| DE | 26 10 675 A1 | 9/1977 |
| DE | 29 36 489 A1 | 3/1980 |
| DE | 30 04 655 A1 | 8/1981 |
| EP | 0 051 563 A1 | 5/1982 |
| EP | 0 161 665 A2 | 11/1985 |
| EP | 0 167 913 A2 | 1/1986 |
| EP | 0 440 072 A1 | 8/1991 |
| EP | 0 667 376 A1 | 8/1995 |
| EP | 0 827 988 A1 | 3/1998 |
| EP | 2 032 524 A1 | 3/2009 |
| GB | 1535334 A | 12/1978 |
| GB | 2030169 A | 4/1980 |
| WO | WO-00/40656 A1 | 7/2000 |
| WO | WO-02/068539 A1 | 9/2002 |
| WO | WO-02/074864 A1 | 9/2002 |
| WO | WO-2004/044058 A1 | 5/2004 |
| WO | WO-2004056925 A1 | 7/2004 |
| WO | WO-2007118818 A1 | 10/2007 |
| WO | WO-2008074719 A1 | 6/2008 |
| WO | WO 2012/095284 A1 * | 7/2012 ............... D06P 3/54 |

OTHER PUBLICATIONS

STIC Search Report dated Dec. 29, 2015.*
U.S. Appl. No. 14/760,832, filed Jul. 14, 2015, Vermandel et al.
International Search Report for PCT/EP2014/050067 mailed Jun. 6, 2014.

* cited by examiner

*Primary Examiner* — Eisa Elhilo
(74) *Attorney, Agent, or Firm* — Drinker Biddle & Reath LLP

(57) ABSTRACT

This invention relates to disperse azo dye mixtures, which have Navy or Black color and are AOX-free.

20 Claims, No Drawings

AOX-FREE NAVY AND BLACK DISPERSE DYES

CROSS-REFERENCE TO RELATED APPLICATIONS

This application is a national stage application (under 35 U.S.C. §371) of PCT/EP2014/050067, filed Jan. 6, 2014, which claims benefit of European Application Nos. 13000169.6, 13151174.3, 13151183.4, all filed Jan. 14, 2013, and 13000205.8 filed Jan. 15, 2013, all of which are incorporated herein by reference in their entirety.

This invention relates to disperse azo dye mixtures, which have Navy or Black colour.

Disperse AOX-free dyes are of growing interest due to ecological reasons. Disperse AOX-free disperse dyes and their use for dyeing polyester and its blends with other fibres such as for example cellulose, elastane/spandex, nylon and wool by normal exhaust dyeing, continuous dyeing and direct printing techniques are already known from e.g. DE 30 04 655, EP 0 827 988 or DE 26 23 251.

They have, however, certain application defects, such as for example an insufficient colour buildup on polyester (good colour build-up results from the ability of a dye to provide a proportionally stronger dyeing when used in higher concentrations in the dye bath), or unsatisfactory fastness properties.

Thus there is a need for disperse dyes which provide dyeings of improved colour depth and good fastness properties of dyed polyester or its blends with other fibres such as cellulose, nylon and wool being free of halogen substituents due to ecological reasons.

Surprisingly the problems can be solved by certain dye mixtures and the present invention therefore is directed to a mixture comprising
at least one dye selected from the group consisting of the dyes of formula (1) and (2)

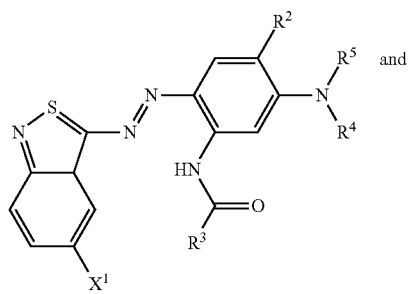

(1)

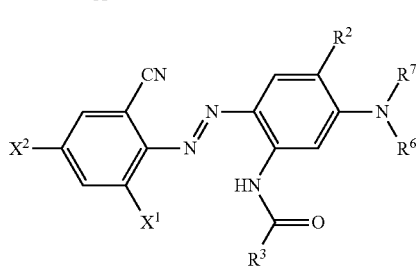

(2)

and
at least one dye selected from the group consisting of the dyes of formula (3a), (3b), (3c), (3d) and (3e)

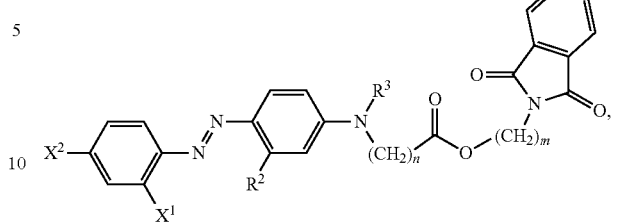

(3a)

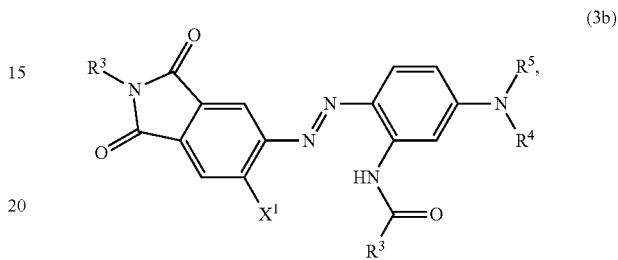

(3b)

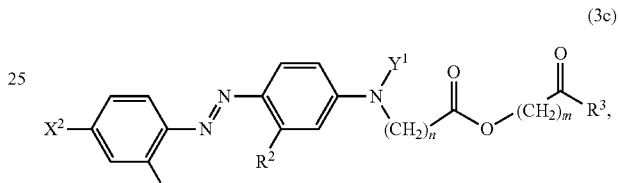

(3c)

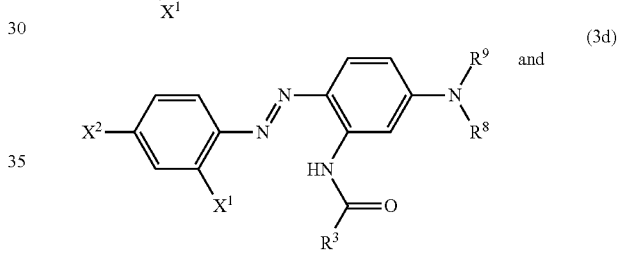

(3d)

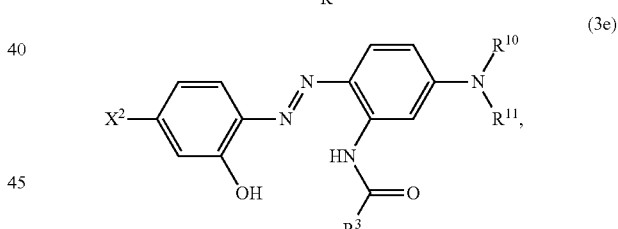

(3e)

and
one dye of formula (4a)

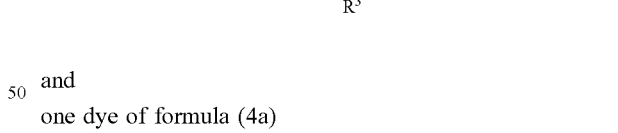

(4a)

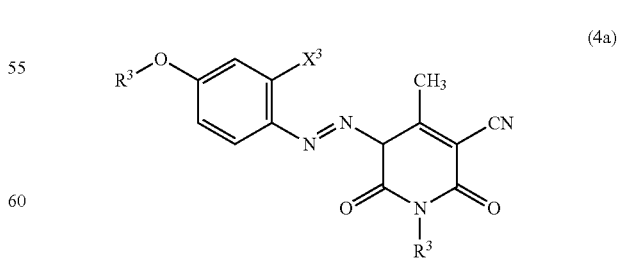

and optionally
at least one dye selected from the group consisting of the dyes of formula (5a) and (5b)

(5a)

(5b)

wherein independent from each other
R² and R³ is hydrogen, (C₁-C₄)-alkoxy or (C₁-C₄)-alkyl,
R⁴ to R¹¹ is (C₁-C₄)-alkyl, —(CH₂)ₙ—O—(C₁-C₄)-alkyl,
—(CH₂)ₙ—O—CO—(C₁-C₄)-alkyl or —(CH₂)ₙ—COO—(C₁-C₄)-alkyl,
X¹ and X² is nitro, cyano, carboxy or CO—NR²R³,
X³ and X⁴ is hydrogen, cyano or nitro,
Y¹ is —(CH₂)ₘ-phenyl substituted by Y², wherein
    Y² is hydrogen, nitro, cyano, carboxy, (C₁-C₄)-alkyl or (C₁-C₄)-alkyoxy,
n is 1, 2, 3 or 4 and
m is 1, 2, 3 or 4.

Preferred is a dye mixture comprising at least one dye of formula (2)

(2)

and
at least one dye selected from the group consisting of the dyes of formula (3a), (3b), (3c), (3d) and (3e)

(3a)

(3b)

(3c)

(3d)

(3e)

and
one dye of formula (4a)

(4a)

and
optionally at least one dye selected from the group consisting of the dyes of formula (5a) and (5b)

(5a)

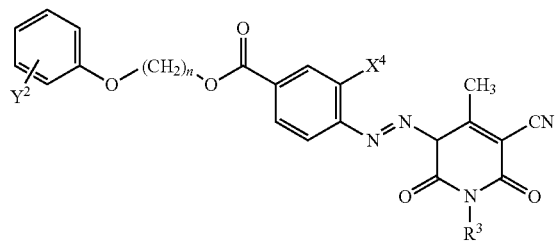
(5b)

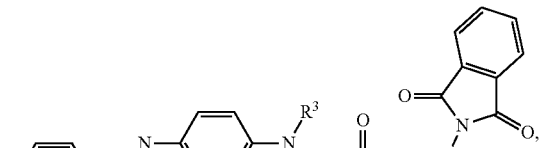
(3a)

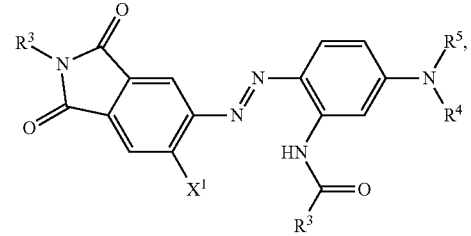
(3b)

wherein independent from each other $R^2$ and $R^3$ is hydrogen, $(C_1\text{-}C_4)$-alkoxy or $(C_1\text{-}C_4)$-alkyl, $R^4$ to $R^{11}$ is $(C_1\text{-}C_4)$-alkyl, $-(CH_2)_n-O-(C_1\text{-}C_4)$-alkyl, $-(CH_2)_n-O-CO-(C_1\text{-}C_4)$-alkyl or $-(CH_2)_n-COO-(C_1\text{-}C_4)$-alkyl, $X^1$ and $X^2$ is nitro, cyano, carboxy or $CO-NR^2R^3$, $X^3$ and $X^4$ is hydrogen, cyano or nitro, $Y^1$ is $-(CH_2)_m$-phenyl substituted by $Y^2$, wherein
  $Y^2$ is hydrogen, nitro, cyano, carboxy, $(C_1\text{-}C_4)$-alkyl or $(C_1\text{-}C_4)$-alkyoxy, n is 1, 2, 3 or 4 and m is 1, 2, 3 or 4.

Even more preferred is a dye mixture comprising at least one dye of formula (I)

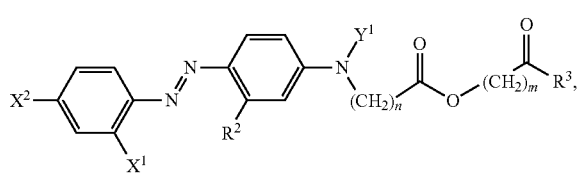
(3c)

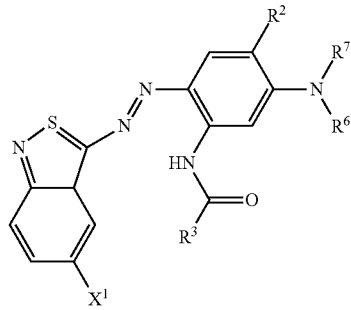
(1)

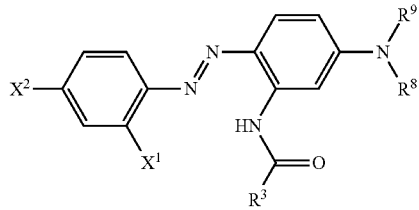
(3d)

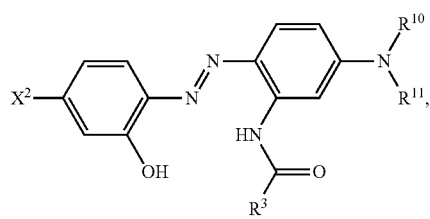
(3e)

and at least one dye of formula (2)

and one dye of formula (4a)

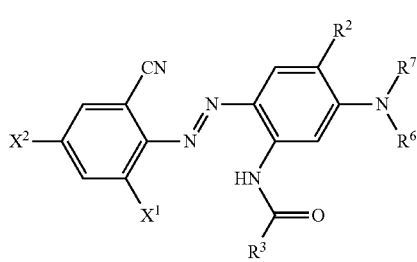
(2)

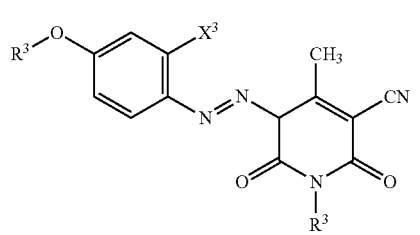
(4a)

and at least one dye selected from the group consisting of the dyes of formula (3a), (3b), (3c), (3d) and (3e)

and optionally at least one dye selected from the group consisting of the dyes of formula (5a) and (5b)

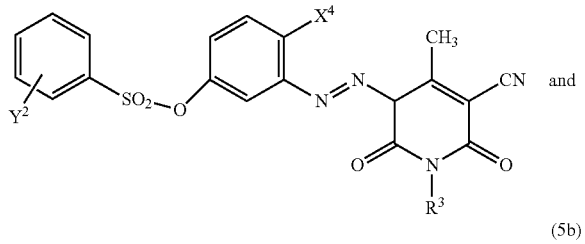

(5a)

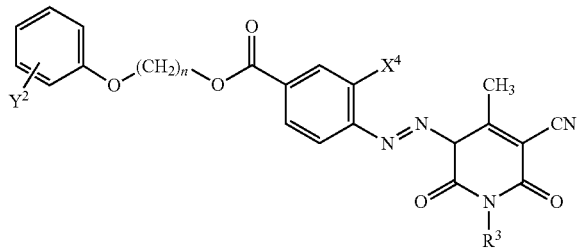

(5b)

wherein independent from each other
$R^2$ and $R^3$ is hydrogen, $(C_1\text{-}C_4)$-alkoxy or $(C_1\text{-}C_4)$-alkyl,
$R^4$ to $R^{11}$ is $(C_1\text{-}C_4)$-alkyl, $-(CH_2)_n-O-(C_1\text{-}C_4)$-alkyl, $-(CH_2)_n-O-CO-(C_1\text{-}C_4)$-alkyl or $-(CH_2)_n-COO-(C_1\text{-}C_4)$-alkyl,
$X^1$ and $X^2$ is nitro, cyano, carboxy or $CO-NR^2R^3$,
$X^3$ and $X^4$ is hydrogen, cyano or nitro,
$Y^1$ is $-(CH_2)_m$-phenyl substituted by $Y^2$, wherein
    $Y^2$ hydrogen, nitro, cyano, carboxy, $(C_1\text{-}C_4)$-alkyl or $(C_1\text{-}C_4)$-alkyoxy,
n is 1, 2, 3 or 4 and
m is 1, 2, 3 or 4.

There also exist preferred dyes for such mixtures and consequently also preferred mixtures and a dye mixture as described above, wherein independent from each other
$R^2$ is hydrogen, methoxy or methyl,
$R^3$, $R^6$ and $R^7$ is $(C_1\text{-}C_4)$-alkyl,
$R^4$ and $R^5$ is $-(CH_2)_n-O-(C_1\text{-}C_4)$-alkyl,
$R^8$ to $R^{11}$ is $-(CH_2)_n-O-CO-(C_1\text{-}C_4)$-alkyl or $-(CH_2)_n-COO-(C_1\text{-}C_4)$-alkyl,
$X^1$, $X^2$ and $X^3$ is cyano or nitro,
$X^4$ is hydrogen,
$Y^1$ is $-(CH_2)_m$-phenyl substituted by $Y^2$, wherein
    $Y^2$ is hydrogen, carboxy, $(C_1\text{-}C_4)$-alkyl or $(C_1\text{-}C_4)$-alkyoxy
n is 1 or 2 and
m is 1 or 2
is preferred.

Even more preferred is a dye mixture as described above, wherein independent from each other
$R^2$ is hydrogen or methoxy,
$R^3$ is methyl or ethyl,
$R^4$ and $R^5$ is $-(CH_2)_n-O-(C_1\text{-}C_2)$-alkyl,
$R^6$ and $R^7$ is $(C_1\text{-}C_4)$-alkyl,
$R^8$ and $R^9$ is $-(CH_2)_n-COO-(C_1\text{-}C_2)$-alkyl,
$R^{10}$ and $R^{11}$ is $-(CH_2)-O-CO-(C_1\text{-}C_2)$-alkyl,
$X^1$, $X^2$ and $X^3$ is cyano or nitro,
$X^4$ is hydrogen,
$Y^1$ is $-(CH_2)_m$-phenyl,
n is 1 or 2 and
m is 1 or 2.

A dye mixture as described above, wherein independent from each other $R^2$ is hydrogen,
$R^3$ is methyl or ethyl,
$R^4$ and $R^5$ is $-(CH_2)_2-O-CH_3$,
$R^6$ and $R^7$ is ethyl,
$R^8$ and $R^9$ is $-(CH_2)_n-COO-CH_3$,
$R^{10}$ and $R^{11}$ is $-(CH_2)-O-CO-(C_1\text{-}C_2)$-alkyl,
$X^1$, $X^2$ and $X^3$ is cyano or nitro,
$X^4$ is hydrogen,
$Y^1$ is $-(CH_2)_m$-phenyl,
n is 1 or 2 and
m is 1 or 2
is most preferred.

The dyes of the dye mixtures of the present invention are known and can be prepared according to known procedures, for example from the documents:
EP 0 167 913, DE 27 15 34, DE 26 10 675, WO 00/040656, U.S. Pat. No. 3,980,634, EP 0 051 563, EP 0 667 376, EP 2 032 524, DE 29 36 489, EP 0 161 665, EP 0 440 072, WO 02/068539, WO 02/074864 and WO 04/044058.

Ranges of weight % of the components of the inventive dye mixtures are e.g.:
1: 0-60
2: 5-85
3a-3e: 5-40
4: 5-40
5a and/or 5b: 0-20.

Preferred ranges of weight % of the components of the inventive dye mixtures are
2: 15-80
3a-3e: 7.5-35
4: 7.5-35
5a and/or 5b: 0-15
and even more preferred ranges of weight % of the components of the inventive dye mixtures are
2: 30-75
3a-3e: 5-30
4: 0-30
5a and/or 5b: 0-10
for those dye mixtures, which do not comprise a dye of formula (I).

Preferred ranges of weight % of the components of the inventive dye mixtures are
1: 1-45
2: 15-80
3a-3e: 7.5-35
4: 7.5-35
5a and/or 5b: 0-15
and even more preferred ranges of weight % of the components of the inventive dye mixtures are
1: 5-30
2: 30-75
3a-3e; 5-30
4: 0-30
5a and/or 5b: 0-10
for those dye mixtures, which comprise at least one dye of formula (I).

In each dye mixture the components 1 to 5b add up to 100% in case the dye mixture consists of the dyes mentioned above or to less than 100% in case additional dyes are added e.g. as shading components. In such a case the amount of shading components preferably is less than 10, more preferred less than 5 and most preferred less than 2 weight % based on the weight of all dyes of the dye mixture.

By mixing the single dyes the mixture(s) according to the present invention can be obtained.

Thus also a process for the production of a dye mixture as described above comprising
a) mixing the components of the dye mixture,
b) homogenizing the mixture obtained in step a).
forms an aspect of the present invention.

In general there are three preferred possibilities:
1) a) mixing the required components of formulae (1) to (5) with dispersing agent,
   b) homogenizing and milling the mixture obtained in step a),
   c) spray drying the milled mixture obtained in step b).
2) Alternatively all single components (1) to (5) can be treated as described above under 1) a) to c)
   and the formulated components of formulae (1) to (5) of the respective steps c) can then be mixed as dry components.
3) As another alternative a combination of both processes is possible wherein the main components of formulae (1) to (5) are treated according to process 1) a) and b) and minor components of formulae (1) to (5) can be added as dry powder treated according to process 2) a) b) and c) to the slurry of the main components and the resulting total mix is then spray dried.

A process for dyeing or printing carboxamido- and/or hydroxyl-containing material, comprising contacting the carboxamido- and/or hydroxyl-containing material with a dye mixture as described above and/or an aqueous solution as described above forms yet another aspect of the present invention.

When the dye mixture of the present invention is used in dyeing, the dye mixture is dispersed in an aqueous medium by means of a dispersing agent and wetting agent in the usual way to prepare a dye bath for dyeing or a printing paste for textile printing.

Typical examples of a dispersing agent are: lignolinsulphonates, naphthalene sulphonic acid/formaldehyde condensates and phenol/cresol/sulphanilic acid/formaldehyde condensates, typical examples of wetting agents are: alkyl aryl ethoxylates which may be sulphonated or phosphated and typical examples of other ingredients which may be present are: inorganic salts, de-dusting agents such as mineral oil or nonanol, organic liquids and buffers. Dispersing agents may be present in amounts of 30 to 500% based on the weight of the dye mixture. Dedusting agents may be used in amounts from 0 to 5% based on the weight of the dye mixture.

In the case of dyeing e.g. polyester fibres and fibre mixture products such as blended yarn fabrics of union cloth products comprising polyester fibres those fibres and/or fibre mixture products can be dyed with good colour fastness by common dyeing methods, such as the high temperature dyeing method, the carrier dyeing method and the thermosol dyeing method. In some cases, the addition of an acid substance to the dye bath may lead to more successful dyeing.

Suitable process conditions may advantageously be selected from the following
(i) exhaust dyeing at a pH of from 4 to 8.5, at a temperature of from 125 to 140° C. for from 10 to 120 minutes and under a pressure of from 1 to 2 bar, a sequestrant optionally being added;
(ii) continuous dyeing at a pH of from 4 to 8.5, at a temperature of from 190 to 225° C. for from 15 seconds to 5 minutes, a migration inhibitor optionally being added;
(iii) direct printing at a pH of from 4 to 6.5, at a temperature of from 160 to 185° C. for from 4 to 15 minutes for high temperature steaming, or at a temperature of from 190 to 225° C. for from 15 seconds to 5 minutes for bake fixation with dry heat or at a temperature of from 120 to 140° C. and 1 to 2 bar for from 10 to 45 minutes for pressure steaming, wetting agents and thickeners (such as alginates) of from 5 to 100% by weight based on the weight of the dye mixture optionally being added;
(iv) discharge printing (by padding the dye mixture on to the textile material, drying and overprinting) at a pH of from 4 to 6.5, migration inhibitors and thickeners optionally being added;
(v) carrier dyeing at a pH of from 4 to 7.5, at a temperature of from 95 to 100° C. using a carrier such as methylnaphthalene, diphenylamine or 2-phenylphenol, sequestrants optionally being added; and
(vi) atmospheric dyeing of acetate, triacetate and nylon at a pH of from 4 to 7.5, at a temperature of about 85° C. for acetate or at a temperature of about 90° C. for triacetate and nylon for from 15 to 90 minutes, sequestrants optionally being added.

In all the above processes, the dye mixture is applied as a dispersion comprising from 0.001 to 20%, preferably from 0.005 to 16%, of the dye mixture in an aqueous medium.

An aqueous solution for dying comprising a dye mixture as described above forms another aspect of the present invention.

In addition to the above-mentioned application processes, the dye mixture may be applied to synthetic textile materials and fibre blends by ink-jet printing, the substrates optionally having been pre-treated to aid printing. For ink-jet applications, the application medium may comprise water and a water-soluble organic solvent, preferably in a weight ratio of from 1:99 to 99:1, more preferably from 1:95 to 2:1 and especially in the range 1:90 to 1:1. The water-soluble organic solvent preferably comprises a $C_1$-$C_4$-alkanol, especially methanol or ethanol, a ketone, especially acetone or methyl ethyl ketone, 2-pyrrolidone or N-methylpyrrolidone, a glycol, especially ethylene glycol, propylene glycol, trimethylene glycol, butane-2,3-diol, thiodiglycol or diethylene glycol, a glycol ether, especially ethylene glycol monomethyl ether, propylene glycol monomethyl ether or diethylene glycol monomethyl ether, urea, a sulphone, especially bis-(2-hydroxyethyl)sulphone or mixtures thereof.

Thus an ink for digital textile printing, comprising a dye mixture as described above forms another aspect of the present invention.

The inventive dye mixture may also be applied to textile materials using supercritical carbon dioxide, in which case the dye formulating agents may optionally be omitted.

Another aspect of the present invention is the use of a dye mixture as described above and/or an aqueous solution as described above for dying fibres, as well as blends of such fibres selected from the group consisting of: synthetic fibres: nylon, nylon-6, nylon-6.6 and aramid fibres, vegetable fibres, seed fibres, cotton, organic cotton, kapok, coir from coconut husk; bast fibres, flax, hemp, jute, kenaf, ramie, rattan; leaf fibres, sisal, henequen, banana; stalk fibres, bamboo; fibres from animals, wool, organic wool, silk, cashmere wool, alpaca fibre, mohair, Angora fibre as well as fur and leather materials; manufactured, regenerated and recycled fibres, cellulosic fibres; paper fibres, cellulosic regenerated fibres, viscose rayon fibres, acetate and triacetate fibres and Lyocell fibres.

Accordingly fibre and blends containing such fibre selected from the group consisting of: synthetic fibre materials, nylon materials, nylon-6, nylon-6.6 and aramid fibres, vegetable fibres, seed fibres, cotton, organic cotton, kapok, coir from coconut husk; bast fibres, flax, hemp, jute, kenaf, ramie, rattan; leaf fibres, sisal, henequen, banana; stalk fibres, bamboo; fibres from animals, wool, organic wool, silk, cashmere wool, alpaca fibre, mohair, Angora fibre as well as fur and leather materials; manufactured, regenerated and recycled fibres, cellulosic fibres; paper fibres, cellulosic regenerated fibres, viscose rayon fibres, acetate and triacetate fibres, and Lyocell fibres comprising a dye mixture as described above either in chemically and/or physically bound form is another aspect of the present invention.

An especially preferred textile material for being dyed with the dye mixture of the present invention is an aromatic polyester or fibre blend thereof with fibres of any of the above mentioned fibre or blend materials. Especially preferred fibre blends include those of polyester-cellulose, such as polyester-cotton, and polyester-wool. The textile materials or blends thereof may be in the form of filaments, loose fibres, yarn or woven or knitted fabrics.

Particularly, among polyester fibres, not only ordinary polyester fibres (regular denier fibres) but also microfibres (fine denier fibres, which are less than 0.6 denier) are to be mentioned as fibres, which can successfully be dyed with the dye mixture of the present invention.

The following examples shall further illustrate the invention, without limiting the scope. Parts and percentages are by weight unless noted otherwise. The relationship of parts by weight to parts by volume is that of the kilogram to the liter

EXAMPLES

Example 1

10 parts dye of the formula (1-1)

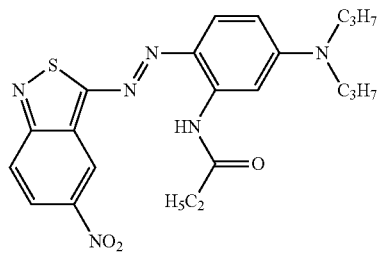
(1-1)

were mixed with 45 parts of a dye of the formula (2-1)

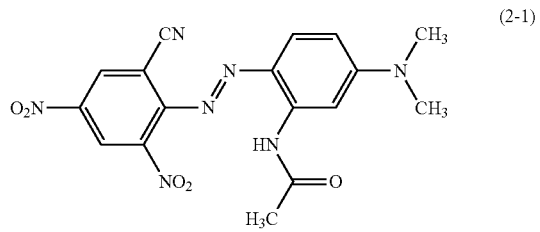 [SMILES: CC(=O)Nc1cc(N(C)C)ccc1/N=N/c1c(C#N)cc([N+](=O)[O-])cc1[N+](=O)[O-]]
(2-1)

and mixed with 20 parts of a dye powder of the formula (3a-1)

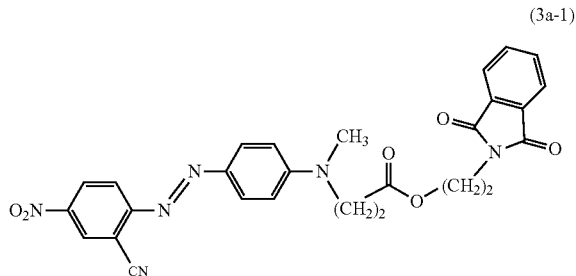
(3a-1)

and mixed with 15 parts of a dye powder of the formula (4-1)

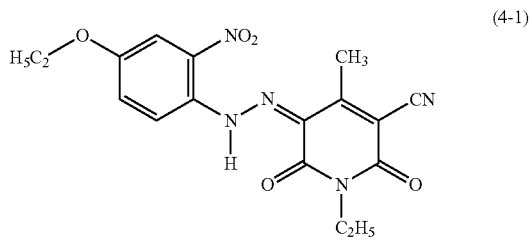
(4-1)

and mixed with 10 parts of a dye powder of the formula (5b-1)

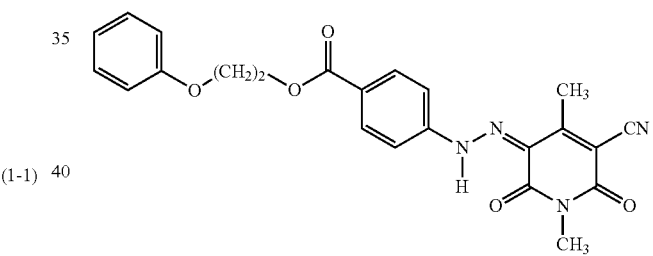
(5b-1)

The resulting dye mixture was formulated using dispersing agent and dried via spray drying and gives very deep black dyeings and prints, on polyester or polyester blends for example, under the dyeing conditions typical for Disperse dyes.

Example 2

13 parts dye of the formula (1-2)

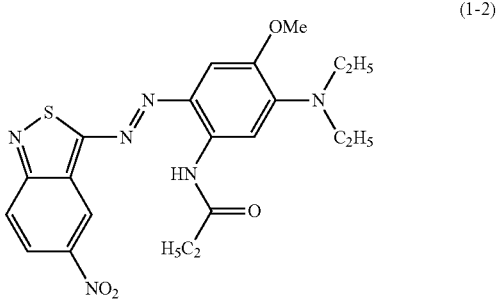
(1-2)

were mixed with 45 parts of a dye of the formula (2-2)

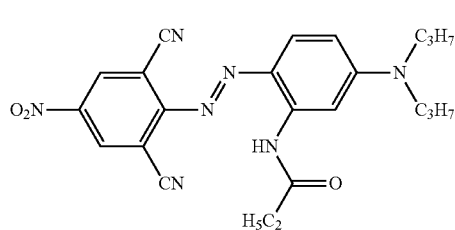
(2-2)

and mixed with 20 parts of a dye powder of the formula (3b-1)

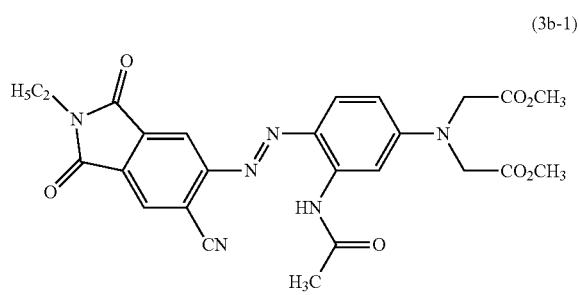
(3b-1)

and mixed with 22 parts of a dye powder of the formula (4-2)

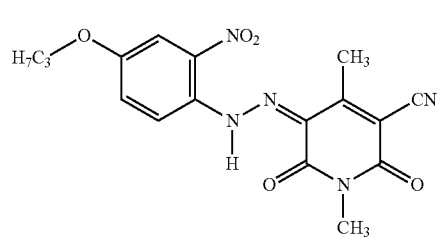
(4-2)

The resulting dye mixture was formulated using dispersing agent and dried via spray drying and gives very deep black dyeings and prints, on polyester or polyester blends for example, under the dyeing conditions typical for disperse dyes.

Example 3

9 parts dye of the formula (1-3)

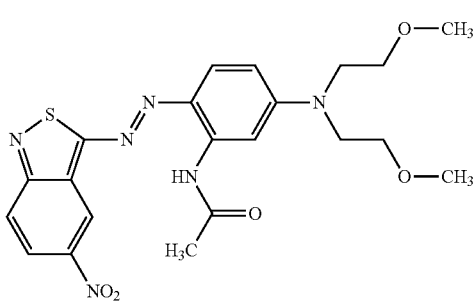
(1-3)

were mixed with 36 parts of a dye of the formula (2-3)

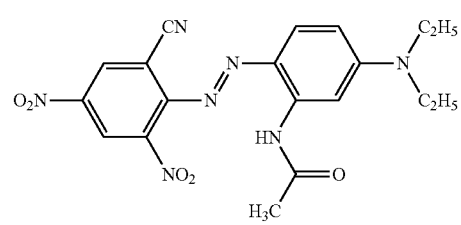
(2-3)

and mixed with 20 parts of a dye powder of the formula (3c-1)

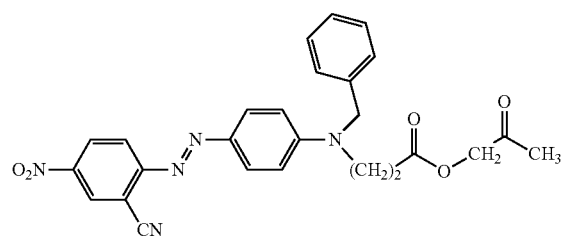
(3c-1)

and mixed with 25 parts of a dye powder of the formula (4)

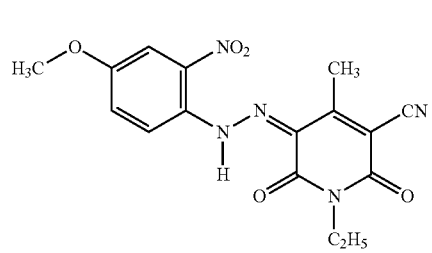
(4-3)

and mixed with 10 parts of a dye powder of the formula (5a)

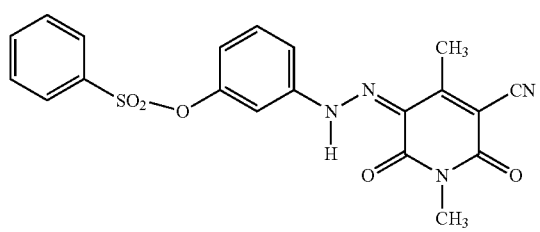
(5a-1)

The resulting dye mixture was formulated using dispersing agent and dried via spray drying and gives very deep black dyeings or prints, on polyester or polyester blends for example, under the dyeing conditions typical for disperse dyes.

Example 4

12 parts dye of the formula (1-2)

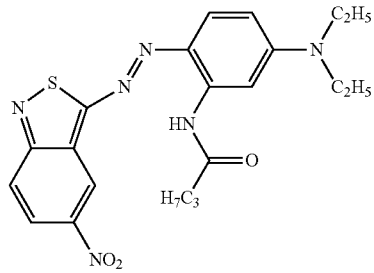
(1-4)

were mixed with 36 parts of a dye of the formula (2-1)

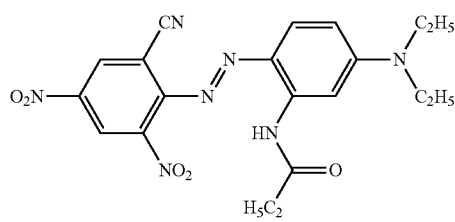
(2-4)

and mixed with 20 parts of a dye powder of the formula (3d-1)

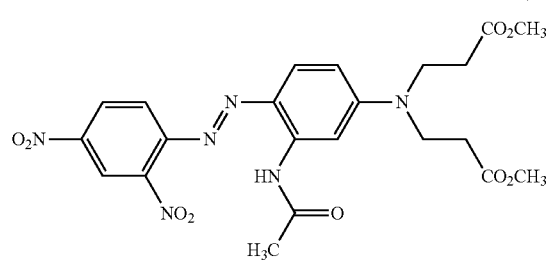
(3d-1)

and mixed with 32 parts of a dye powder of the formula (4-4)

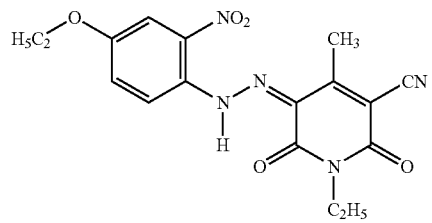
(4-4)

The resulting dye mixture was formulated using dispersing agent and dried via spray drying and gives very deep black dyeings and prints, on polyester or polyester blends for example, under the dyeing conditions typical for disperse dyes.

Example 5

5 parts dye of the formula (1-3)

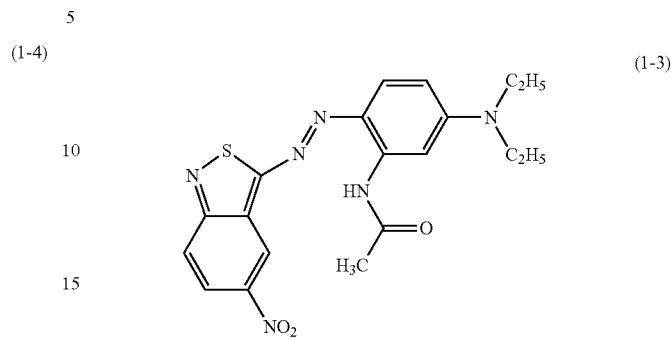
(1-3)

were mixed with 78 parts of a dye of the formula (2-3)

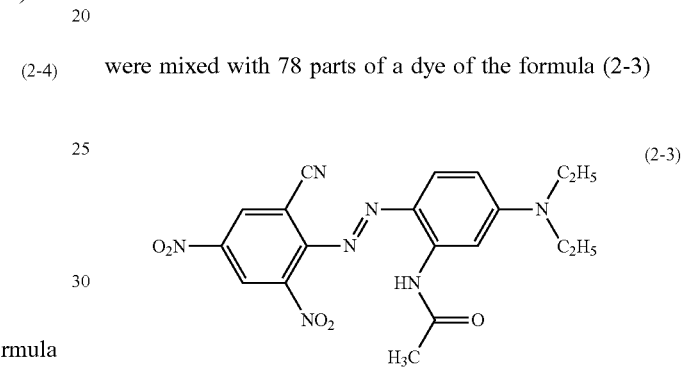
(2-3)

and mixed with 10 parts of a dye powder of the formula (3d-1)

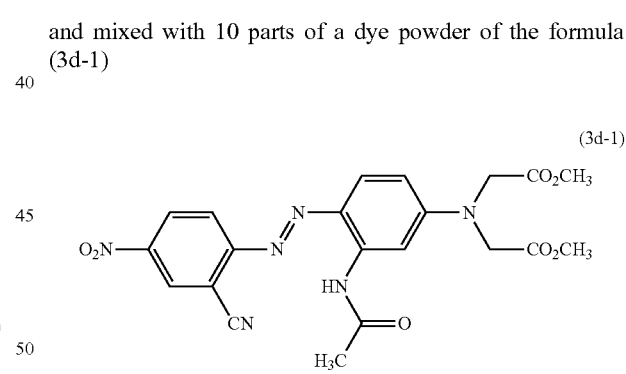
(3d-1)

and mixed with 5 parts of a dye powder of the formula (4)

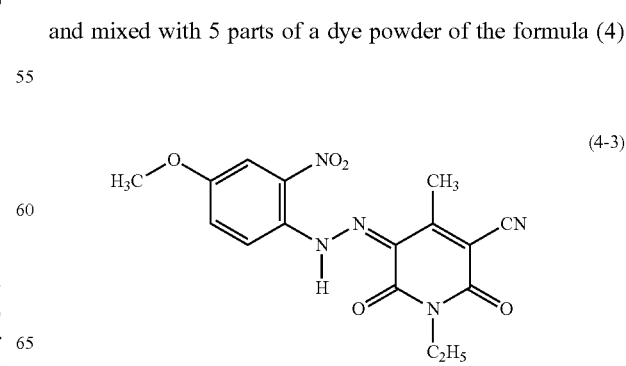
(4-3)

and mixed with 2 parts of a dye powder of the formula (5a)

(5a-2)

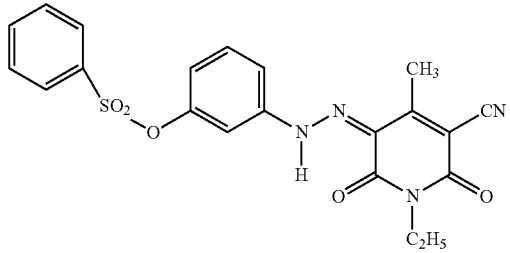

The resulting dye mixture of the invention was formulated using dispersing agent to and dried via spray drying and gives very deep navy dyeings or prints, on polyester or polyester blends for example, under the dyeing conditions typical for disperse dyes.

Example 6

10 parts dye of the formula (1-2)

(1-5)

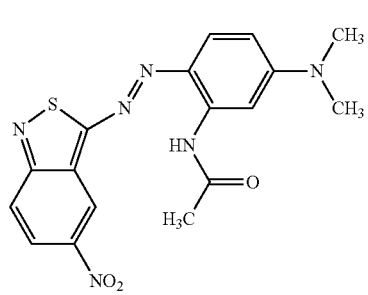

were mixed with 70 parts of a dye of the formula (2-1)

(2-5)

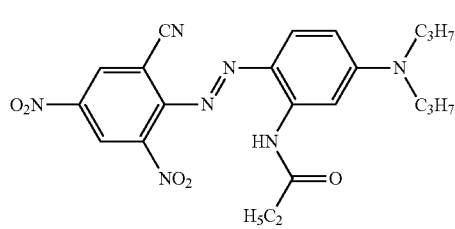

and mixed with 15 parts of a dye powder of the formula (3e-1)

(3e-1)

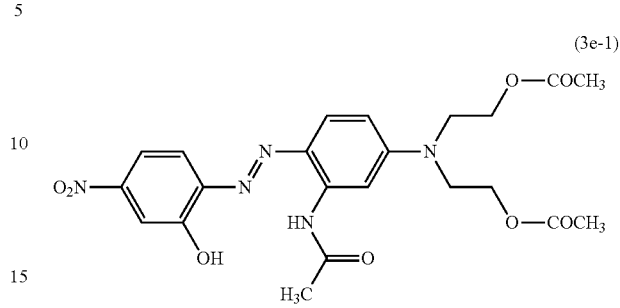

and mixed with 5 parts of a dye powder of the formula (4-4)

(4-4)

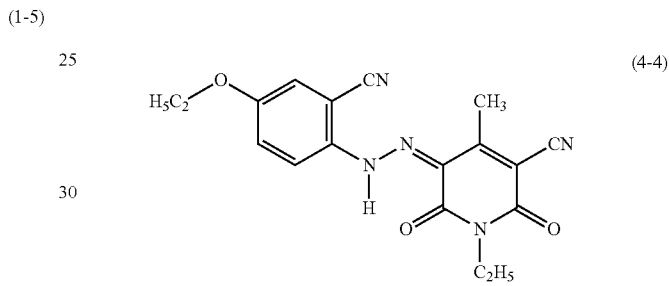

The resulting dye mixture was formulated using dispersing agent and dried via spray drying and gives very deep navy dyeings and prints, on polyester or polyester blends for example, under the dyeing conditions typical for Disperse dyes.

All examples of the following table are prepared as formulations as explained above, using dispersing- and dedusting agents.

| Expl | Dye of formula (1) | Dye of formula (2) | Dye of formula (3) | Dye of formula (4) | Dye of formula (5) | Ratio (1):(2):(3):(4):(5) | Shade on Polyester |
|---|---|---|---|---|---|---|---|
| 7 | — | $X^1 = NO_2$<br>$X^2 = NO_2$<br>$R^2 = OCH_3$<br>$R^3 = CH_3$<br>$R^6, R^7 = C_2H_5$ | (3a)<br>$X^1 = CN$<br>$X^1 = NO_2$<br>$R^2 = H$<br>$R^3 = CH_3$<br>n = 2, m = 2 | $X^3 = NO_2$<br>$R^2 = CH_3$<br>$R^3 = C_2H_5$ | (5a)<br>$X^4 = H$<br>$R^3 = CH_3$<br>$Y^2 = H$ | 0:45:20:25:10 | Deep reddish Black |
| 8 | $X^1 = CN$<br>$R^2 = H$<br>$R^3 = CH_3$<br>$R^4; R^5 = (CH_2)_2OCH_3$ | $X^1 = NO_2$<br>$X^2 = NO_2$<br>$R^2 = H$<br>$R^3 = CH_3$<br>$R^6, R^7 = C_2H_5$ | (3b)<br>$X^1 = CN$<br>$R_2 = C_2H_5$<br>$R^3 = CH_3$<br>$R^4; R^5 = (CH_2)_2OCH_3$ | $X^3 = NO_2$<br>$R^2 = CH_3$<br>$R^3 = C_2H_5$ | (5a)<br>$X^4 = H$<br>$R^3 = CH_3$<br>$Y^2 = H$ | 11:33:24:22:10 | Deep Black |
| 9 | $X^1 = CN$<br>$R^2 = H$<br>$R^3 = CH_3$<br>$R^4; R^5 = (CH_2)_2OCH_3$ | $X^1 = NO_2$<br>$X^2 = NO_2$<br>$R^2 = H$<br>$R^3 = CH_3$<br>$R^6, R^7 = C_2H_5$ | (3d)<br>$X^1 = CN$<br>$X^2 = NO_2$<br>$R^3 = CH_3$<br>$R^8; R^9 = CH_2COOCH$ | $X^3 = NO_2$<br>$R^2 = CH_3$<br>$R^3 = C_2H_5$ | (5b)<br>$X^4 = H$<br>$R^3 = CH_3$<br>$Y^2 = H$<br>n = 2 | 18:44:18:15:5 | Deep Black |
| 10 | $X^1 = CN$<br>$R^2 = OCH_3$<br>$R^3 = CH_3$<br>$R^4; R^5 = (CH_2)_2OCH_3$ | $X^1 = NO_2$<br>$X^2 = NO_2$<br>$R^2 = OC_2H_5$<br>$R^3 = CH_3$<br>$R^6, R^7 = C_2H_5$ | (3d)<br>$X^1 = NO_2$<br>$X^2 = NO_2$<br>$R^3 = CH_3$<br>$R^8; R^9 = CH_2COOCH_3$ | $X^3 = NO_2$<br>$R^2 = CH_3$<br>$R^3 = C_2H_5$ | (5a)<br>$X^4 = H$<br>$R^3 = CH_3$<br>$Y^2 = H$ | 12:40:22:19:7 | Deep Black |

-continued

| Expl | Dye of formula (1) | Dye of formula (2) | Dye of formula (3) | Dye of formula (4) | Dye of formula (5) | Ratio (1):(2):(3):(4):(5) | Shade on Polyester |
|---|---|---|---|---|---|---|---|
| 11 | $X^1$ = CN<br>$R^2$ = H<br>$R^3$ = $CH_3$<br>$R^4$; $R^5$ = $(CH_2)_2OCH_3$ | $X^1$ = $NO_2$<br>$X^2$ = $NO_2$<br>$R^2$ = H<br>$R^3$ = $CH_3$<br>$R^6, R^7$ = $C_2H_5$ | (3d)<br>$X^1$ = $NO_2$<br>$X^2$ = $NO_2$<br>$R^3$ = $CH_3$<br>$R^8; R^9$ = $C_2H_5COOCH_3$ | $X^3$ = $NO_2$<br>$R^2$ = $CH_3$<br>$R^3$ = $C_2H_5$ | (5a)<br>$X^4$ = H<br>$R^3$ = $CH_3$<br>$Y^2$ = H | 9:36:16:29:10 | Deep Black |
| 12 | $X^1$ = CN<br>$R^2$ = $OCH_3$<br>$R^3$ = $CH_3$<br>$R^4$; $R^5$ = $(CH_2)_2OCH_3$ | $X^1$ = $NO_2$<br>$X^2$ = $NO_2$<br>$R^2$ = H<br>$R^3$ = $CH_3$<br>$R^6, R^7$ = $C_2H_5$ | (3d)<br>$X^1$ = CN<br>$X^2$ = $NO_2$<br>$R^3$ = $CH_3$<br>$R^8; R^9$ = $C_2H_5COOCH_3$ | $X^3$ = $NO_2$<br>$R^2$ = $CH_3$<br>$R^3$ = $C_2H_5$ | (5b)<br>$X^4$ = H<br>$R^3$ = $CH_3$<br>$Y^2$ = H<br>n = 2 | 15:40:25:15:5 | Deep Black |
| 13 | $X^1$ = CN<br>$R^2$ = H<br>$R^3$ = $CH_3$<br>$R^4$; $R^5$ = $(CH_2)_2OCH_3$ | $X^1$ = $NO_2$<br>$X^2$ = $NO_2$<br>$R^2$ = H<br>$R^3$ = $CH_3$<br>$R^6, R^7$ = $C_2H_5$ | (3e)<br>$X^1$ = $NO_2$<br>$X^2$ = $NO_2$<br>$R^3$ = $CH_3$<br>$R^{10}; R^{11}$ = $C_2H_4OCOCH_3$ | $X^3$ = $NO_2$<br>$R^2$ = $CH_3$<br>$R^3$ = $C_2H_5$ | (5b)<br>$X^4$ = H<br>$R^3$ = $CH_3$<br>$Y^2$ = H<br>n = 2 | 20:35:20:15:10 | Deep Black |
| 14 | $X^1$ = CN<br>$R^2$ = H<br>$R^3$ = $CH_3$<br>$R^4$; $R^5$ = $(CH_2)_2OCH_3$ | $X^1$ = $NO_2$<br>$X^2$ = $NO_2$<br>$R^2$ = H<br>$R^3$ = $CH_3$<br>$R^6, R^7$ = $C_2H_5$ | (3c)<br>$X^1$ = CN<br>$X^2$ = $NO_2$<br>$R^2$ = H<br>$R^3$ = $CH_3$<br>$Y^1$ = $CH_2$-phenyl<br>n = 2, m = 1 | $X^3$ = $NO_2$<br>$R^2$ = $CH_3$<br>$R^3$ = $C_2H_5$ | (5a)<br>$X^4$ = H<br>$R^3$ = $CH_3$<br>$Y^2$ = H | 5:80:10:3:2 | Navy |
| 15 | $X^1$ = CN<br>$R^2$ = H<br>$R^3$ = $CH_3$<br>$R^4$; $R^5$ = $(CH_2)_2OCH_3$ | $X^1$ = $NO_2$<br>$X^2$ = $NO_2$<br>$R^2$ = H<br>$R^3$ = $CH_3$<br>$R^6, R^7$ = $C_2H_5$ | (3c)<br>$X^1$ = CN<br>$X^2$ = $NO_2$<br>$R^2$ = H<br>$R^3$ = $CH_3$<br>$Y^1$ = $CH_2$-phenyl<br>n = 2, m = 1 | $X^3$ = $NO_2$<br>$R^2$ = $CH_3$<br>$R^3$ = $C_2H_5$ | (5b)<br>$X^4$ = H<br>$R^3$ = $CH_3$<br>$Y^2$ = H<br>n = 2 | 10:70:15:3:2 | Navy |
| 16 | $X^1$ = CN<br>$R^2$ = $OCH_3$<br>$R^3$ = $CH_3$<br>$R^4$; $R^5$ = $(CH_2)_2OCH_3$ | $X^1$ = $NO_2$<br>$X^2$ = $NO_2$<br>$R^2$ = H<br>$R^3$ = $CH_3$<br>$R^6, R^7$ = $C_2H_5$ | (3c)<br>$X^1$ = CN<br>$X^2$ = $NO_2$<br>$R^2$ = H<br>$R^3$ = $CH_3$<br>$Y^1$ = $CH_2$-phenyl<br>n = 2, m = 1 | $X^3$ = $NO_2$<br>$R^2$ = $CH_3$<br>$R^3$ = $C_2H_5$ | — | 8:72:15:5:0 | Navy |
| 17 | $X^1$ = CN<br>$R^2$ = H<br>$R^3$ = $CH_3$<br>$R^4$; $R^5$ = $(CH_2)_2OCH_3$ | $X^1$ = $NO_2$<br>$X^2$ = $NO_2$<br>$R^2$ = $OCH_3$<br>$R^3$ = $CH_3$<br>$R^6, R^7$ = $C_2H_5$ | (3a)<br>$X^1$ = CN<br>$X^1$ = $NO_2$<br>$R^2$ = H<br>$R^3$ = $CH_3$<br>n = 2, m = 2 | $X^3$ = $NO_2$<br>$R^2$ = $CH_3$<br>$R^3$ = $C_2H_5$ | (5a)<br>$X^4$ = H<br>$R^3$ = $CH_3$<br>$Y^2$ = H | 8:78:10:3:2 | Navy |
| 18 | $X^1$ = CN<br>$R^2$ = H<br>$R^3$ = $CH_3$<br>$R^4$; $R^5$ = $(CH_2)_2OCH_3$ | $X^1$ = $NO_2$<br>$X^2$ = $NO_2$<br>$R^2$ = H<br>$R^3$ = $CH_3$<br>$R^6, R^7$ = $C_2H_5$ | (3b)<br>$X^1$ = CN<br>$R^2$ = $C_2H_5$<br>$R^3$ = $CH_3$<br>$R^4$; $R^5$ = $(CH_2)_2OCH3$ | $X^3$ = $NO_2$<br>$R^2$ = $CH_3$<br>$R^3$ = $C_2H_5$ | — | 11:69:14:6:0 | Navy |
| 19 | $X^1$ = CN<br>$R^2$ = H<br>$R^3$ = $CH_3$<br>$R^4$; $R^5$ = $(CH_2)_2OCH_3$ | $X^1$ = $NO_2$<br>$X^2$ = $NO_2$<br>$R^2$ = H<br>$R^3$ = $CH_3$<br>$R^6, R^7$ = $C_2H_5$ | (3c)<br>$X^1$ = CN<br>$X^2$ = $NO_2$<br>$R^2$ = H<br>$R^3$ = $CH_3$<br>$Y^1$ = $CH_2$-phenyl<br>n = 2, m = 1 | $X^3$ = $NO_2$<br>$R^2$ = $CH_3$<br>$R^3$ = $C_2H_5$ | (5a)<br>$X^4$ = H<br>$R^3$ = $CH_3$<br>$Y^2$ = H | 45:10:15:10 | Deep Black |
| 20 | $X^1$ = CN<br>$R^2$ = H<br>$R^3$ = $CH_3$<br>$R^4$; $R^5$ = $(CH_2)_2OCH_3$ | $X^1$ = $NO_2$<br>$X^2$ = $NO_2$<br>$R^2$ = H<br>$R^3$ = $CH_3$<br>$R^6, R^7$ = $C_2H_5$ | (3c)<br>$X^1$ = CN<br>$X^2$ = $NO_2$<br>$R^2$ = H<br>$R^3$ = $CH_3$<br>$Y^1$ = $CH_2$-phenyl<br>n = 2, m = 1 | $X^3$ = $NO_2$<br>$R^2$ = $CH_3$<br>$R^3$ = $C_2H_5$ | (5a)<br>$X^4$ = H<br>$R^3$ = $CH_3$<br>$Y^2$ = H | 60:15:20:3:2 | Navy |
| 21 | — | $X^1$ = $NO_2$<br>$X^2$ = $NO_2$<br>$R^2$ = H<br>$R^3$ = $CH_3$<br>$R^6, R^7$ = $C_2H_5$ | (3b)<br>$X^1$ = CN<br>$R^2$ = $C_2H_5$<br>$R^3$ = $CH_3$<br>$R^4$; $R^5$ = $(CH_2)_2OCH3$ | $X^3$ = $NO_2$<br>$R^2$ = $CH_3$<br>$R^3$ = $C_2H_5$ | — | —:80:14:6:0 | Navy |

The invention claimed is:
1. A dye mixture comprising
at least one dye of formula (I)

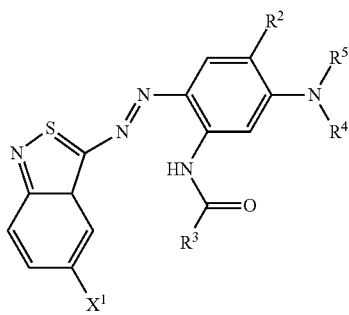
(1)

and
at least one dye of formula (2)

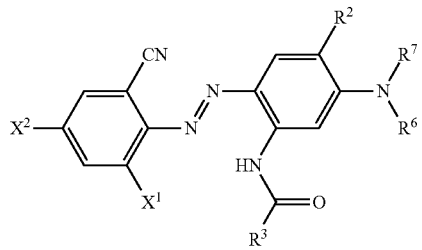
(2)

and
at least one dye selected from the group consisting of the dyes of formula (3a), (3b), (3c), (3d) and (3e)

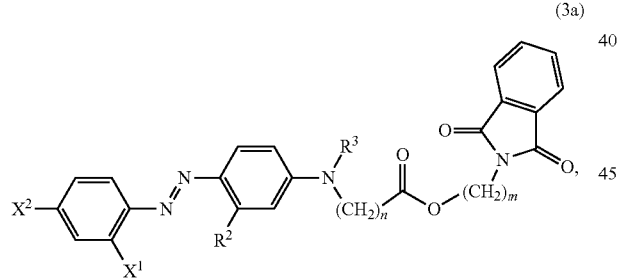
(3a)

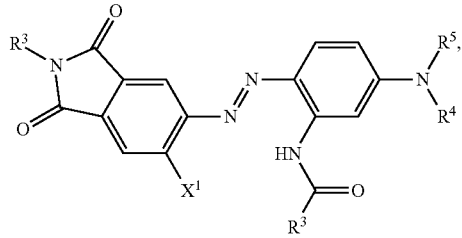
(3b)

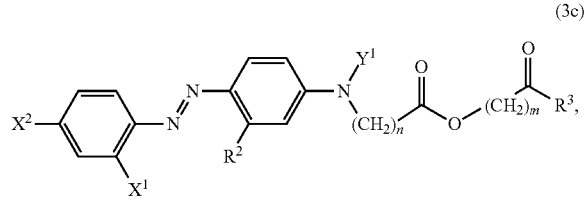
(3c)

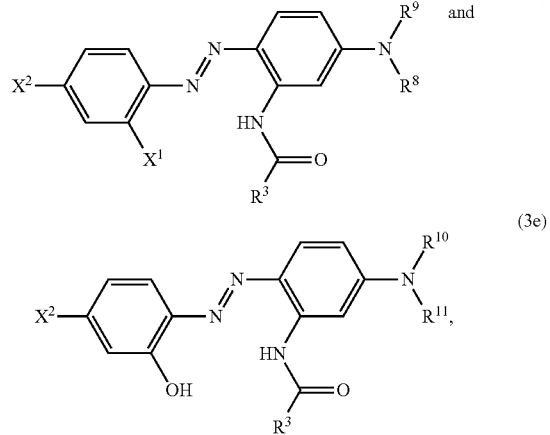
(3d)

(3e)

and
one dye of formula (4a)

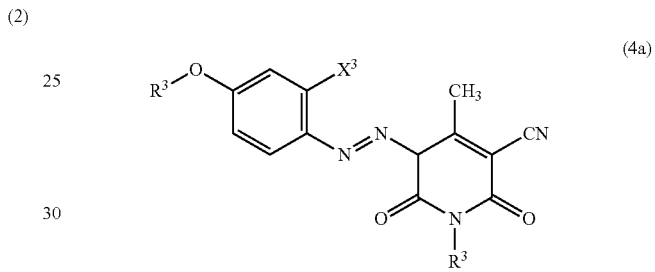
(4a)

and optionally
at least one dye selected from the group consisting of the dyes of formula (5a) and (5b)

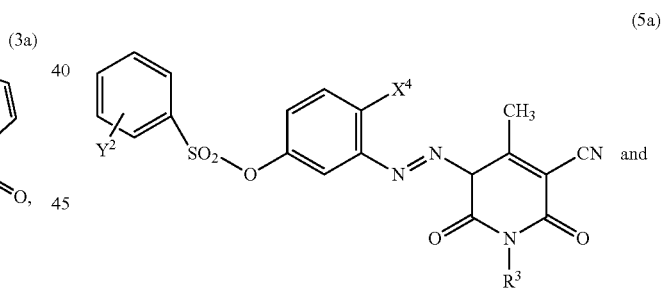
(5a)

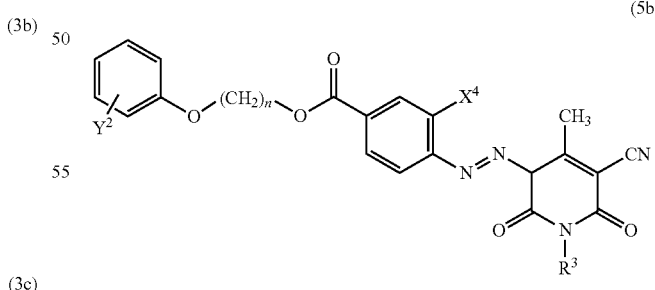
(5b)

wherein independent from each other
$R^2$ and $R^3$ is hydrogen, $(C_1\text{-}C_4)$-alkoxy or $(C_1\text{-}C_4)$-alkyl,
$R^4$ to $R^{11}$ is $(C_1\text{-}C_4)$-alkyl, $-(CH_2)_n-O-(C_1\text{-}C_4)$-alkyl, $-(CH_2)_n-O-CO-(C_1\text{-}C_4)$-alkyl or $-(CH_2)_n-COO-(C_1\text{-}C_4)$-alkyl,
$X^1$ and $X^2$ is nitro, cyano, carboxy or $CO-NR^2R^3$,
$X^3$ and $X^4$ is hydrogen, cyano or nitro, Y$^1$ is —(CH$_2$)$_m$-phenyl substituted by Y$^2$, wherein
  Y$^2$ is hydrogen, nitro, cyano, carboxy, (C$_1$-C$_4$)-alkyl or (C$_1$-C$_4$)-alkyoxy,
n is 1, 2, 3 or 4 and
m is 1, 2, 3 or 4.

2. The dye mixture according to claim 1, wherein independent from each other
R$^2$ is hydrogen, methoxy or methyl,
R$^3$, R$^6$ and R$^7$ is (C$_1$-C$_4$)-alkyl,
R$^4$ and R$^5$ is —(CH$_2$)$_n$—O—(C$_1$-C$_4$)-alkyl,
R$^8$ to R$^{11}$ is —(CH$_2$)$_n$—O—CO—(C$_1$-C$_4$)-alkyl or —(CH$_2$)$_n$—COO—(C$_1$-C$_4$)-alkyl,
X$^1$, X$^2$ and X$^3$ is cyano or nitro,
X$^4$ is hydrogen,
Y$^1$ is —(CH$_2$)$_m$-phenyl substituted by Y$^2$, wherein
  Y$^2$ is hydrogen, carboxy, (C$_1$-C$_4$)-alkyl or (C$_1$-C$_4$)-alkyoxy
n is 1 or 2 and
m is 1 or 2.

3. The dye mixture according to claim 1, wherein independent from each other
R$^2$ is hydrogen,
R$^3$ is methyl or ethyl,
R$^4$ and R$^5$ is —(CH$_2$)$_n$—O—(C$_1$-C$_2$)-alkyl,
R$^6$ and R$^7$ is (C$_1$-C$_4$)-alkyl,
R$^8$ and R$^9$ is —(CH$_2$)$_n$—COO—(C$_1$-C$_2$)-alkyl,
R$^{10}$ and R$^{11}$ is —(CH$_2$)$_n$—O—CO—(C$_1$-C$_2$)-alkyl,
X$^1$, X$^2$ and X$^3$ is cyano or nitro,
X$^4$ is hydrogen,
Y$^1$ is —(CH$_2$)$_m$-phenyl,
n is 1 or 2 and
m is 1 or 2.

4. The dye mixture according to claim 1, wherein independent from each other
R$^2$ is hydrogen,
R$^3$ is methyl or ethyl,
R$^4$ and R$^5$ is —(CH$_2$)$_2$—O—CH$_3$,
R$^6$ and R$^7$ is ethyl,
R$^8$ and R$^9$ is —(CH$_2$)$_n$—COO—CH$_3$,
R$^{10}$ and R$^{11}$ is —(CH$_2$)—O—CO—(C$_1$-C$_2$)-alkyl,
X$^1$, X$^2$ and X$^3$ is cyano or nitro,
X$^4$ is hydrogen,
Y$^1$ is —(CH$_2$)$_m$-phenyl,
n is 1 or 2 and
m is 1 or 2.

5. An aqueous solution for dying comprising the dye mixture according to claim 1.

6. A process for the production of the dye mixture according to claim 1, comprising
  a) mixing the components of the dye mixture,
  b) homogenizing the mixture obtained in step a).

7. A process for dyeing or printing carboxamido- and/or hydroxyl-containing material, comprising contacting the carboxamido- and/or hydroxyl-containing material with the dye mixture according to claim 1.

8. A process for dyeing or printing carboxamido- and/or hydroxyl-containing material, comprising contacting the carboxamido- and/or hydroxyl-containing material with the aqueous solution according to claim 5.

9. An ink for digital textile printing comprising the dye mixture according to claim 1.

10. A process for dying fibres which comprises contacting the fibres with the dye mixture as claimed in claim 1, wherein the fibres are selected from the group consisting of: synthetic fibres: nylon, nylon-6, nylon-6.6 and aramid fibres, vegetable fibres, seed fibres, cotton, organic cotton, kapok, coir from coconut husk; bast fibres, flax, hemp, jute, kenaf, ramie, rattan; leaf fibres, sisal, henequen, banana; stalk fibres, bamboo; fibres from animals, wool, organic wool, silk, cashmere wool, alpaca fibre, mohair, Angora fibre as well as fur and leather materials; manufactured, regenerated and recycled fibres, cellulosic fibres; paper fibres, cellulosic regenerated fibres, viscose rayon fibres, acetate and triacetate fibres and Lyocell fibres.

11. A process for dying fibres which comprises contacting the fibres with the aqueous solution according to claim 5, wherein the fibres are selected from the group consisting of: synthetic fibres: nylon, nylon-6, nylon-6.6 and aramid fibres, vegetable fibres, seed fibres, cotton, organic cotton, kapok, coir from coconut husk; bast fibres, flax, hemp, jute, kenaf, ramie, rattan; leaf fibres, sisal, henequen, banana; stalk fibres, bamboo; fibres from animals, wool, organic wool, silk, cashmere wool, alpaca fibre, mohair, Angora fibre as well as fur and leather materials; manufactured, regenerated and recycled fibres, cellulosic fibres; paper fibres, cellulosic regenerated fibres, viscose rayon fibres, acetate and triacetate fibres and Lyocell fibres.

12. A fibre and blends containing such fibre selected from the group consisting of: synthetic fibre materials, nylon materials, nylon-6, nylon-6.6 and aramid fibres, vegetable fibres, seed fibres, cotton, organic cotton, kapok, coir from coconut husk; bast fibres, flax, hemp, jute, kenaf, ramie, rattan; leaf fibres, sisal, henequen, banana; stalk fibres, bamboo; fibres from animals, wool, organic wool, silk, cashmere wool, alpaca fibre, mohair, Angora fibre as well as fur and leather materials; manufactured, regenerated and recycled fibres, cellulosic fibres; paper fibres, cellulosic regenerated fibres, viscose rayon fibres, acetate and triacetate fibres, and Lyocell fibres comprising the dye mixture according to claim 1 either in chemically and/or physically bound form.

13. An aqueous solution for dying comprising the dye mixture according to claim 4.

14. A process for the production of the dye mixture according to claim 4, comprising
  a) mixing the components of the dye mixture,
  b) homogenizing the mixture obtained in step a).

15. A process for dyeing or printing carboxamido- and/or hydroxyl-containing material, comprising contacting the carboxamido- and/or hydroxyl-containing material with the dye mixture according to claim 4.

16. A process for dyeing or printing carboxamido- and/or hydroxyl-containing material, comprising contacting the carboxamido- and/or hydroxyl-containing material with the aqueous solution according to claim 4.

17. An ink for digital textile printing comprising the dye mixture according to claim 4.

18. A process for dying fibres which comprises contacting the fibres with the dye mixture as claimed in claim 4, wherein the fibres are selected from the group consisting of: synthetic fibres: nylon, nylon-6, nylon-6.6 and aramid fibres, vegetable fibres, seed fibres, cotton, organic cotton, kapok, coir from coconut husk; bast fibres, flax, hemp, jute, kenaf, ramie, rattan; leaf fibres, sisal, henequen, banana; stalk fibres, bamboo; fibres from animals, wool, organic wool, silk, cashmere wool, alpaca fibre, mohair, Angora fibre as well as fur and leather materials; manufactured, regenerated and recycled fibres, cellulosic fibres; paper fibres, cellulosic regenerated fibres, viscose rayon fibres, acetate and triacetate fibres and Lyocell fibres.

19. A process for dying fibres which comprises contacting the fibres with the aqueous solution according to claim 13, wherein the fibres are selected from the group consisting of: synthetic fibres: nylon, nylon-6, nylon-6.6 and aramid fibres, vegetable fibres, seed fibres, cotton, organic cotton, kapok, coir from coconut husk; bast fibres, flax, hemp, jute, kenaf, ramie, rattan; leaf fibres, sisal, henequen, banana; stalk fibres, bamboo; fibres from animals, wool, organic wool, silk, cashmere wool, alpaca fibre, mohair, Angora fibre as well as fur and leather materials; manufactured, regenerated and recycled fibres, cellulosic fibres; paper fibres, cellulosic regenerated fibres, viscose rayon fibres, acetate and triacetate fibres and Lyocell fibres.

20. A fibre and blends containing such fibre selected from the group consisting of: synthetic fibre materials, nylon materials, nylon-6, nylon-6.6 and aramid fibres, vegetable fibres, seed fibres, cotton, organic cotton, kapok, coir from coconut husk; bast fibres, flax, hemp, jute, kenaf, ramie, rattan; leaf fibres, sisal, henequen, banana; stalk fibres, bamboo; fibres from animals, wool, organic wool, silk, cashmere wool, alpaca fibre, mohair, Angora fibre as well as fur and leather materials; manufactured, regenerated and recycled fibres, cellulosic fibres; paper fibres, cellulosic regenerated fibres, viscose rayon fibres, acetate and triacetate fibres, and Lyocell fibres comprising the dye mixture according to claim 4 either in chemically and/or physically bound form.

\* \* \* \* \*